(12) United States Patent
Jin

(10) Patent No.: US 12,541,833 B2
(45) Date of Patent: Feb. 3, 2026

(54) ASSESSING IMAGE/VIDEO QUALITY USING AN ONLINE MODEL TO APPROXIMATE SUBJECTIVE QUALITY VALUES

(71) Applicant: Tencent Technology (Shenzhen) Company Limited, Guangdong (CN)

(72) Inventor: Feijian Jin, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 453 days.

(21) Appl. No.: 17/986,817

(22) Filed: Nov. 14, 2022

(65) Prior Publication Data
US 2023/0072918 A1    Mar. 9, 2023

Related U.S. Application Data

(63) Continuation of application No. PCT/CN2022/080254, filed on Mar. 11, 2022.

(30) Foreign Application Priority Data

Apr. 13, 2021   (CN) .......................... 202110395015.2

(51) Int. Cl.
*G06N 20/00*   (2019.01)
*G06T 7/00*   (2017.01)
*G06V 10/764*   (2022.01)

(52) U.S. Cl.
CPC ........ *G06T 7/0002* (2013.01); *G06T 2200/16* (2013.01); *G06T 2207/10016* (2013.01);
(Continued)

(58) Field of Classification Search
CPC .............. G06T 7/0002; G06T 2200/16; G06T 2207/10016; G06T 2207/20081;
(Continued)

(56) References Cited

U.S. PATENT DOCUMENTS

2015/0161172 A1* 6/2015 Bengio ................. G06V 20/35
707/749
2015/0278706 A1* 10/2015 Shivashankar ........ G06N 20/00
706/12

(Continued)

FOREIGN PATENT DOCUMENTS

CN    104902267 A    9/2015
CN    108665455 A    10/2018
(Continued)

OTHER PUBLICATIONS

International Search Report in PCT/CN2022/080254, mailed on May 20, 2022, 9 pages.

(Continued)

*Primary Examiner* — Aaron W Carter
*Assistant Examiner* — Kyla Guan-Ping Tiao Allen
(74) *Attorney, Agent, or Firm* — ArentFox Schiff LLP

(57) ABSTRACT

A method for assessing image/video quality includes obtaining a sample, and calculating a first approximate value approximating a subjective quality value of the sample by using an online model based on parameters of the sample. The online model is implemented by a server. The method further includes assessing quality of the video or the image of the sample based on the first approximate value. The online model is obtained based on an offline model, and the offline model is obtained by using k training samples and subjective quality values of the k training samples as a training set. The subjective quality values of the k training samples are obtained in a subjective scoring manner, and the online model is obtained by fitting parameters of the k training samples with reference to approximate values of the k training samples obtained by using the offline model.

20 Claims, 6 Drawing Sheets

What do you think about the quality of this video?

5-Very good

4-Good

3-Average

2-Poor

1-Very poor

To-be-scored video

| View a previous video | View the video again | Confirm and view a next video | Exit scoring |

(52) U.S. Cl.
CPC .............. *G06T 2207/20081* (2013.01); *G06T 2207/30168* (2013.01)

(58) Field of Classification Search
CPC .......... G06T 2207/30168; G06T 2207/20084; G06N 20/00; G06N 3/08; G06N 3/045; G06N 3/084; G06N 3/044; G06V 10/82; G06V 10/764; G06V 10/774
See application file for complete search history.

(56) References Cited

U.S. PATENT DOCUMENTS

| | | | | |
|---|---|---|---|---|
| 2016/0358321 | A1* | 12/2016 | Xu | G06N 3/045 |
| 2017/0301077 | A1* | 10/2017 | Merhav | G06T 7/0002 |
| 2018/0121730 | A1* | 5/2018 | Li | G06T 7/0002 |
| 2018/0286032 | A1* | 10/2018 | Bovik | G06T 7/0002 |
| 2019/0254525 | A1* | 8/2019 | Takahashi | G06T 5/20 |
| 2020/0162725 | A1* | 5/2020 | Hong | H04N 21/4665 |
| 2020/0324206 | A1* | 10/2020 | Yilmazcoban | G06N 3/044 |
| 2021/0287361 | A1* | 9/2021 | Shriram | G06T 7/73 |
| 2022/0036535 | A1* | 2/2022 | Lee | H04N 19/176 |

FOREIGN PATENT DOCUMENTS

| | | | | |
|---|---|---|---|---|
| CN | 111210426 | A | | 5/2020 |
| CN | 111524110 | A | | 8/2020 |
| CN | 111640099 | A | | 9/2020 |
| CN | 111741330 | A | | 10/2020 |
| EP | 1763248 | A1 | | 3/2007 |
| GB | 2530997 | A | * 4/2016 | ........... G06T 1/0007 |
| JP | 2018-516412 | A | | 6/2018 |

OTHER PUBLICATIONS

Office Action and Search Report received for Chinese Patent Application No. 202110395015.2, mailed on Jul. 24, 2025, 22 pages (12 pages of English Translation and 10 pages of Original Document).

Office Action received for Japanese Patent Application No. 2023-558311, mailed on Aug. 5, 2025, 7 pages (4 pages of English Translation and 3 pages of Original Document).

* cited by examiner

ASSESSING IMAGE/VIDEO QUALITY USING AN ONLINE MODEL TO APPROXIMATE SUBJECTIVE QUALITY VALUES

RELATED APPLICATIONS

This application is a continuation of International Application No. PCT/CN2022/080254, entitled "METHOD FOR ASSESSING QUALITY OF IMAGE OR VIDEO ON BASIS OF APPROXIMATION VALUE, AND RELATED APPARATUS" and filed on Mar. 11, 2022, which claims priority to Chinese Patent Application No. 202110395015.2, entitled "METHOD AND RELATED APPARATUS FOR ASSESSING IMAGE/VIDEO QUALITY BASED ON APPROXIMATE VALUE" and filed on Apr. 13, 2021. The entire disclosures of the prior applications are hereby incorporated by reference.

FIELD OF THE TECHNOLOGY

Embodiments of this application relate to the technical fields of technologies such as computer vision (image) or machine learning, including image/video quality assessment based on an approximate value.

BACKGROUND OF THE DISCLOSURE

For the image/video quality, an image/video quality indicator may be generally calculated by using an algorithm model.

Generally, a video subjective scoring model and a calculated value may indicate subjective and objective quality of the video, which have poor effect in terms of calculation complexity and accuracy. For example, an objective quality score of a game video may be determined only by using a quantization parameter (QP), a peak signal-to-noise ratio (PSNR), and a structural similarity (SSIM) of an encoder. In such a manner, the complexity is not high, but a correlation with subjective quality assessment is low, which has a certain limitation and may introduce a certain delay effect. In another example, the objective quality score of the game video may be obtained through a video multimethod assessment fusion (VAMF) model and the like. Compared with the PSNR, such a manner is more accurate, but the calculation complexity is much higher, and the video cannot be assessed in real time with a high frame rate and a high resolution.

In addition, massive video data needs to acquire a subjective video score in real time due to various types of cloud games. However, there is no model and related solution for determining a subjective quality in real time in the related art.

In view of this, a method for assessing image/video quality based on real-time feedback of subjective quality needs to be urgently provided in the field.

SUMMARY

This disclosure provides a method and related apparatus for assessing image/video quality based on an approximate value, which can assess image/video quality based on a real-time feedback approximate value approximating a subjective truth value while server-side hardware costs are not increased and assessment accuracy is ensured.

In an embodiment, a method for assessing image/video quality includes obtaining a sample, the sample comprising a video or an image, and calculating a first approximate value approximating a subjective quality value of the sample by using an online model based on parameters of the sample. The online model is implemented by a server. The method further includes assessing quality of the video or the image of the sample based on the first approximate value. The online model is obtained based on an offline model, and the offline model is obtained by using k training samples and subjective quality values of the k training samples as a training set, the subjective quality values of the k training samples are obtained in a subjective scoring manner. The online model is obtained by fitting parameters of the k training samples with reference to approximate values of the k training samples obtained by using the offline model, k being a positive integer.

In an embodiment, an apparatus for assessing image/video quality includes processing circuitry configured to obtain a sample, the sample comprising a video or an image, and calculate a first approximate value approximating a subjective quality value of the sample by using an online model based on parameters of the sample. The online model is implemented by a server. The online model is obtained based on an offline model, and the offline model is obtained by using k training samples and subjective quality values of the k training samples as a training set, the subjective quality values of the k training samples are obtained in a subjective scoring manner. The online model is obtained by fitting parameters of the k training samples with reference to approximate values of the k training samples obtained by using the offline model, k being a positive integer.

In an embodiment, a method for training a first model includes obtaining k training samples, subjective quality values of the k training samples being obtained in a subjective scoring manner, and using the k training samples and the subjective quality values of the k training samples as a training set, to obtain a second model. The k training samples include at least one of video samples or image samples. The method further includes inputting the k training samples into the second model to obtain, as output, approximate values approximating the subjective quality values of the k training samples, and fitting parameters of the k training samples with reference to the approximate values of the k training samples, to obtain the first model.

Based on the above, in the method provided in this disclosure, image/video quality can be assessed based on a real-time feedback approximate value approximating a subjective truth value while server-side hardware costs are not increased and assessment accuracy is ensured.

BRIEF DESCRIPTION OF THE DRAWINGS

To describe the technical solutions in the embodiments of this disclosure more clearly, the following briefly describes the accompanying drawings required for describing the embodiments. The accompanying drawings in the following description show merely some embodiments of this disclosure, and a person of ordinary skill in the art may still derive other drawings from these accompanying drawings.

DESCRIPTION OF EMBODIMENTS

Figures 1, 2:
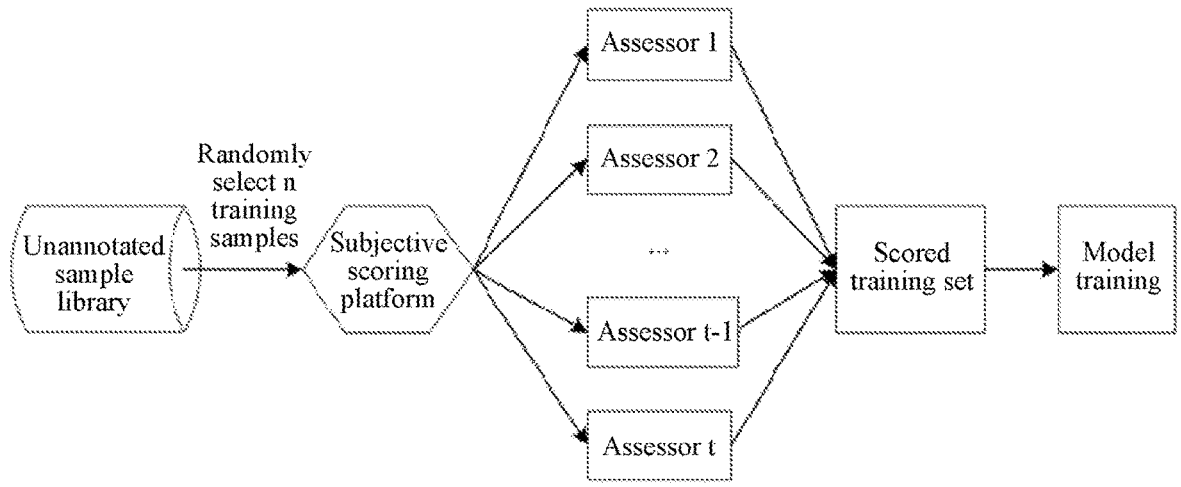
FIG. 1 is a schematic diagram of an interface of a subjective scoring platform according to an embodiment of this disclosure.
FIG. 2 is a schematic flowchart of a method for training a quality assessment model based on a randomly selected sample according to an embodiment of this disclosure.

The technical solutions in the embodiments of this disclosure are clearly and completely described in the following with reference to the accompanying drawings in the embodiments of this disclosure. The described embodiments are merely some rather than all of the embodiments of this disclosure. All other embodiments obtained by a person of ordinary skill in the art based on the embodiments of this disclosure shall fall within the protection scope of this disclosure.

The solutions provided in this disclosure may relate to an artificial intelligence (AI) technology.

AI is a theory, method, technology, and application system that uses a digital computer or a machine controlled by a digital computer to simulate, extend, and expand human intelligence, perceive the environment, acquire knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

It is to be understood that, the AI technology is a comprehensive subject, relating to a wide range of fields, and involving both hardware and software techniques. The basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning/deep learning.

With the research and progress of the AI technology, the AI technology is studied and applied in a plurality of fields such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied to more fields, and play an increasingly important role.

For example, the embodiments of this disclosure mainly may relate to the CV technology of the AI technology. The CV is a science that studies how to use a machine to "see", and furthermore, is machine vision that a camera and a computer are used for replacing human eyes to perform recognition, tracking, measurement, and the like on a target, and further perform graphic processing, so that the computer processes the target into an image more suitable for human eyes to observe, or an image transmitted to an instrument for detection. As a scientific discipline, CV studies related theories and technologies and attempts to establish an AI system that can obtain information from images or multi-dimensional data. The CV technologies generally include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, and map construction, and further include biometric feature recognition technologies such as common face recognition and fingerprint recognition.

The embodiments of this disclosure may also relate to machine learning (ML) of the AI technology. ML is a multi-disciplinary subject involving a plurality of disciplines such as probability theory, statistics, approximation theory, convex analysis, and algorithm complexity theory. The ML specializes in studying how a computer simulates or implements a human learning behavior to obtain new knowledge or skills, and reorganize an existing knowledge structure, so as to keep improving its performance. The ML is the core of AI, is a basic way to make the computer intelligent, and is applied to various fields of AI. ML and deep learning generally include technologies such as an artificial neural network, a belief network, reinforcement learning, transfer learning, inductive learning, and learning from demonstrations.

For ease of understanding of the solutions of this disclosure, related terms involved in this disclosure are described below.

(1) Image/video quality assessment is perception, measurement, and assessment performed on distortion of an image or a video frame in a subjective/objective manner. The subjective grading manner is generally expressed by mean opinion score (MOS) or a difference mean opinion score (DMOS), and the subjective grading manner may also be referred to as a subjective scoring manner. An image/video quality indicator may be calculated generally by using an algorithm model in the objective grading manner, and the objective grading manner may also be referred to as a manner of outputting a quality score by using a quality assessment model.

(2) Subjective scoring platform is an annotation platform for subjective scoring of an image or a video frame, where the subjectively scoring is to score by an assessor/annotator on quality or aesthetics of a picture or a video.

FIG. 1 is a schematic diagram of an interface of a subjective scoring platform according to an embodiment of this disclosure.

As shown in FIG. 1, the interface of the subjective scoring platform may include a to-be-scored video and scoring options. For example, a five-point scale may be used for scoring, that is, scoring options are respectively as follows: very good, good, average, poor, and very poor. A to-be-scored video is generally scored by a plurality of assessors, an assessor selects a grade, and a final quality score of the to-be-scored video is obtained according to an average of scores given by all assessors. There is another subjective scoring manner such as paired comparison. In such a manner, the assessor needs to select a better one from two images or videos.

(3) Active learning: the subjective scoring platform needs to select a part of training samples from a library of massive images/videos for the assessor to give a subjective score, and the manner of obtaining a subjective score by performing subjective scoring on the training samples by the assessor may be referred to as obtaining a subjective score of the training sample in a subjective scoring manner, samples marked with subjective scores may be referred to as marked samples. Active learning can actively select training samples which are considered by the model as being the most difficult to distinguish or having a large amount of information for the assessor to score. In such a manner, a quantity of to-be-marked samples may be effectively reduced while performance of the model may be ensured.

(4) Passive learning generally adopts randomly selected samples for model training.

FIG. 2 is a schematic flowchart of a method for training a quality assessment model based on a randomly selected sample according to an embodiment of this disclosure.

As shown in FIG. 2, a process of training the quality assessment model is a "waterfall" algorithm development process. Several (n) training samples are randomly selected from the massive database for the subjective scoring platform for the assessors (that is, including an assessor 1 to an assessor t) to score, and after scoring, the model is obtained by training. For the method for training a quality assessment model, many worthless training samples may be selected through random sample selection, and especially in the library of massive images/videos, there may be a lot of similar and redundant data. Moreover, a quantity of selected training samples needs to preset, which is not easy to control. In addition, subjective scoring and model training are completely isolated, and in such a "waterfall" development process, subjective scoring needs to be performed again in a case that a dataset after scored is of low quality, which is very time-consuming and labor-intensive with low fault tolerance.

(5) Mean opinion score (MOS) is final quality score of a training sample mentioned above, where a specific value of the score may be obtained from the average of the scores given by all the assessors. For example, the subjective truth value involved in this disclosure may be a MOS.

(6) Fitting is to connect a series of points on a plane with a smooth curve. Since there are an infinite number of possibilities for connecting curves, there are various fitting manners. The fitted curve may generally be represented by a function, and different functions may have different fitting names. A commonly used fitting manner includes a least square curve fitting manner, or the like. The fitting name may be referred to as linear fitting or linear regression (mainly in statistics) in a case that a pending function is linear; or otherwise, the fitting name is referred to as non-linear fitting or non-linear regression. The expression may also be a piecewise function, and in this case the fitting name is spline fitting. For example, a first model involved in this disclosure may be a model obtained through fitting. A prediction result of the first model may be an approximate value approximating the subjective truth value.

(7) Training is to use an image/video dataset after subjectively scoring as an input, to obtain a model through training. For example, a second model involved in this disclosure may be a model obtained through training. A prediction result of the second model may be an approximate value approximating the subjective truth value.

(8) Image quality assessment (IQA) is one of basic technologies in image processing, which mainly analyzes and studies properties of images, and then assesses quality of the images (a degree of image distortion). Image quality assessment plays an important role in algorithm analysis and comparison, system performance assessment, and the like in an image processing system. Recently, with the extensive research in the field of digital images, the research of image quality assessment has also attracted more and more attention of researchers, and many indicators and methods of image quality assessment have been proposed and improved.

(9) Video quality assessment (VQA) is one of basic technologies in video processing, which mainly analyzes and studies properties of videos, and then assesses quality of the videos (a degree of video distortion).

Generally, a video subjective scoring model and a calculated value may indicate subjective and objective quality of the video, which have poor effect in terms of calculation complexity and accuracy. For example, an objective quality score of a game video may be fed back only by using a quantization parameter (QP), a peak signal-to-noise ratio (PSNR), and a structural similarity (SSIM) of an encoder. In such a manner, the complexity is not high, but a correlation with subjective quality assessment is low, which has a certain limitation and may introduce a certain delay effect. In another example, the objective quality score of the game video may be obtained through a video multimethod assessment fusion (VAMF) model and the like. Compared with the PSNR, such a manner is more accurate, but the calculation complexity is much higher, and the video cannot be calculated in real time with a high frame rate and a high resolution.

In addition, massive video data needs to acquire a subjective video score in real time due to various types of cloud games. However, there is no model and related solution for feeding back a subjective quality in real time in the related art.

In view of this, this disclosure provides a method for assessing image/video quality based on an approximate value, which can assess image/video quality based on a real-time feedback approximate value approximating a subjective truth value while server-side hardware costs are not increased and assessment accuracy is ensured.

Figure 3:
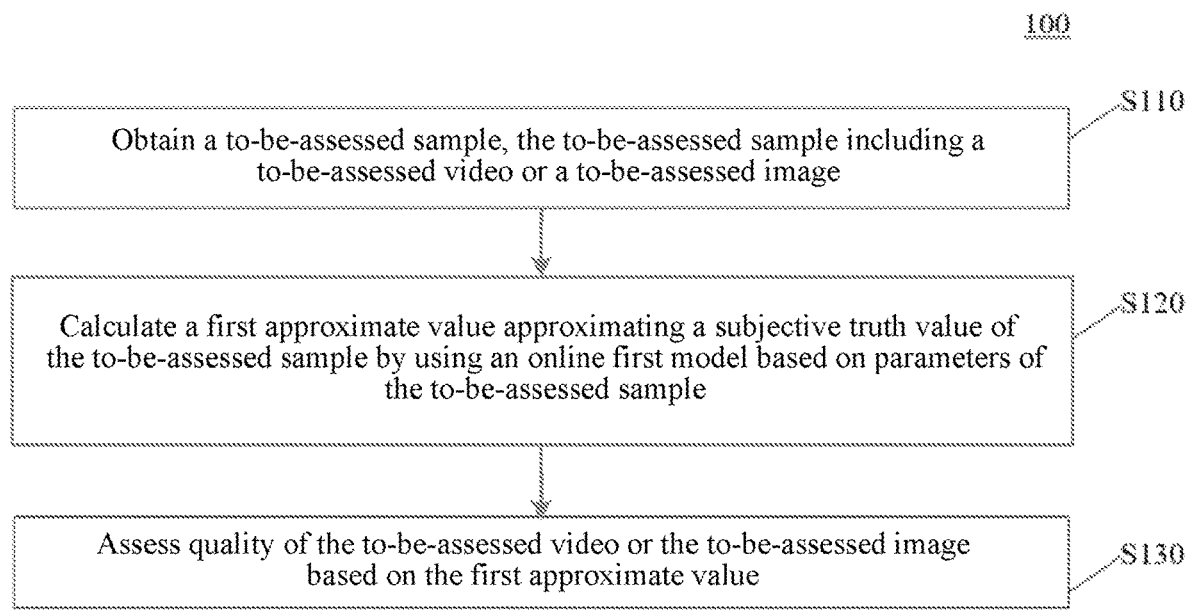
FIG. 3 is a schematic flowchart of a method for assessing image/video quality based on an approximate value according to an embodiment of this disclosure.

FIG. 3 is a schematic flowchart of a method 100 for assessing image/video quality based on an approximate value according to an embodiment of this disclosure. The solutions provided in the embodiments of this disclosure may be performed by any electronic device having a data processing capability. For example, the electronic device may be implemented as a server. The server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, big data, and an artificial intelligence platform. The server may be directly or indirectly connected in a wired or wireless communication manner. This is not limited in this disclosure. For ease of description, the description is made below by using a service system as an example.

As shown in FIG. 3, the method 100 includes some or all of the following content:

S110: Obtain a to-be-assessed sample, the to-be-assessed sample including a to-be-assessed video or a to-be-assessed image. For example, a sample is obtained, the sample including a video or an image.

S120. Calculate a first approximate value approximating a subjective truth value of the to-be-assessed sample by using an online first model based on parameters of the to-be-assessed sample. For example, a first approximate value approximating a subjective quality value of the sample is calculated by using an online model based on parameters of the sample. The online model is implemented by a server.

The first model is a model obtained based on an offline second model, and the second model (offline model) is a model obtained by using k training samples and subjective truth values of the k training samples as a training set, the subjective truth values of the k training samples being obtained in a subjective scoring manner, and the first model being a model obtained by fitting parameters of the k training samples with reference to approximate values of the k training samples obtained by using the second model, k being a positive integer.

S130. Assess quality of the to-be-assessed video or the to-be-assessed image based on the first approximate value. For example, quality of the video or the image of the sample is assessed based on the first approximate value.

In a cloud game running mode, the game runs on a server side, a rendered game video image is obtained in a screenshot manner and is compressed by a video encoder, and then the image is transmitted to a user client through a network. Based on this, in the method for assessing image/video quality based on an approximate value, the user client may assess image/video quality based on a real-time feedback approximate value approximating a subjective truth value.

In this embodiment of this disclosure, a first approximate value approximating a subjective truth value of the to-be-assessed sample is calculated by using an online first model based on parameters of the to-be-assessed sample; and quality of the to-be-assessed video or the to-be-assessed image is assessed based on the first approximate value. According to an aspect, the first approximate value may be calculated and fed back in real time by using the online first model, so that image/video quality may be assessed based on a real-time feedback approximate value approximating a subjective truth value. According to another aspect, the first model is constructed as a model obtained based on an offline second model, and the second model is constructed as a model obtained by using k training samples and subjective truth values of the k training samples as a training set, the subjective truth values of the k training samples being obtained in a subjective scoring manner, and the first model being a model obtained by fitting parameters of the k training samples with reference to approximate values of the k training samples obtained by using the second model, k being a positive integer. In other words, the first model is obtained by using the second model obtained through training in a fitting manner, which can ensure assessment accuracy of the first model without increasing server-side hardware costs.

Based on the above, in the method provided in this disclosure, image/video quality can be assessed based on a real-time feedback approximate value approximating a subjective truth value while server-side hardware costs are not increased and assessment accuracy is ensured. In other words, an approximate value approximating a subjective truth value of the to-be-assessed sample may be calculated online through the first model, and then cloud game video quality may be assessed according to the approximate value calculated through the first model. Equivalently, subjective quality of the video may be assessed in real time during online gaming. For example, it can be used for monitoring cloud game quality online.

In this embodiment of this disclosure, the user may use a set of cloud game video quality assessment solutions close to an application scenario on a user client, to obtain a subjective truth value in a subjective scoring manner and use the value as a training sample for the second model. For example, the interface of the subjective scoring platform shown in FIG. 1 may be used. In another example, the process shown in FIG. 2 may be used to train the second model based on randomly selected samples. This disclosure is not limited thereto.

In some embodiments, the parameters of the to-be-assessed sample include at least one of the following: a feedback parameter of a network module, a set parameter of a cloud game module, or a calculation parameter of a codec module. In an implementation, a type of the parameter of the to-be-assessed sample may be defined based on the classification of a software development kit (SDK). For example, the SDK includes, but is not limited to, a network SDK, a cloud game SDK, a codec SDK, and the like.

Figure 4:
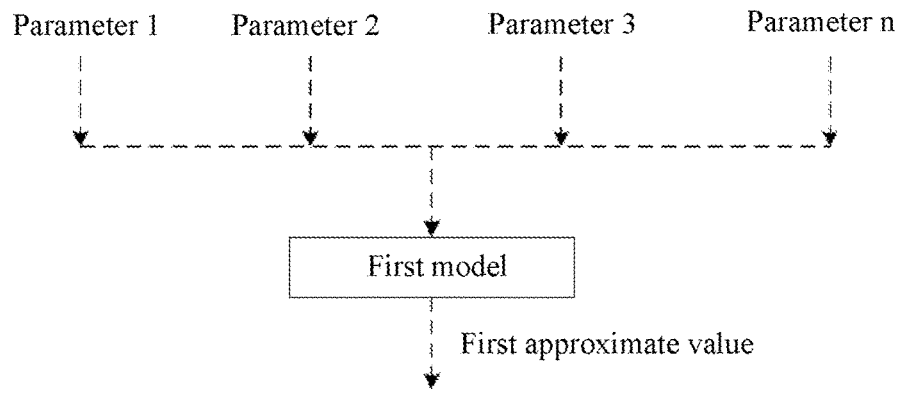
FIG. 4 is a schematic block diagram of an operating principle of a first model according to an embodiment of this disclosure.

FIG. 4 is a schematic block diagram of an operating principle of a first model according to an embodiment of this disclosure.

As shown in FIG. 4, the first model selects parameters (for example, according to scenarios) by using a parameter 1 to a parameter n inputted into the to-be-assessed sample. The scenario may be related to, but not limited to, encoding parameters of the to-be-assessed sample, for example, parameters and bit streams of an encoding frame such as a quantization parameter (QP), an MV, a frame rate, a frame length, a frame complexity parameter, a frame type, and the like. The frame complexity parameter may be, for example, a sum of absolute transformed differences (SATDs). The frame rate may be a quantity of pictures played per second. For example, 24-frame means playing 24 pictures per second, 60-frame means playing 60 pictures per second, and so on. The frame length may be a length of a data frame. The first approximate value approximating the subjective truth value of the to-be-assessed sample may be obtained by calculating the inputted parameter 1 to parameter n.

In some embodiments, before S120 is performed based on the parameters of the to-be-assessed sample, the method 100 may further include:

calculating the approximate values of the k training samples by using the first model based on the parameters of the k training samples; assessing the first model based on the approximate values of the k training samples obtained by using the second model and the approximate values of the k training samples calculated by using the first model; and for each of the k training samples, determining that an assessment result of the first model is positive in a case that a difference between an approximate value calculated by using the first model and an approximate value obtained by using the second model is less than or equal to a first preset threshold; or otherwise, determining that the assessment result of the first model is negative. For example, for any one of the k training samples, it is determined that the assessment result of the first model is negative in a case that a difference between an approximate value calculated by using the first model and an approximate value obtained by using the second model is greater than the first preset threshold.

Briefly, performance or accuracy of the first model may be assessed by using approximate values obtained by using the second model.

In some embodiments, before S120 is performed based on the parameters of the to-be-assessed sample, the method 100 may further include:

assessing the first model based on the subjective truth values of the k training samples and the approximate values of the k training samples calculated by using the first model; and for each of the k training samples, determining that an assessment result of the first model is positive in a case that a difference between an approximate value calculated by using the first model and a subjective truth value is less than or equal to a second preset threshold; or otherwise, determining that the assessment result of the first model is negative. For example, for any one of the k training samples, it is determined that the assessment result of the first model is negative in a case that a difference between an approximate value calculated by using the first model and a subjective truth value is greater than the second preset threshold.

Briefly, the performance or accuracy of the first model may be assessed by using the subjective truth value.

Figure 5:
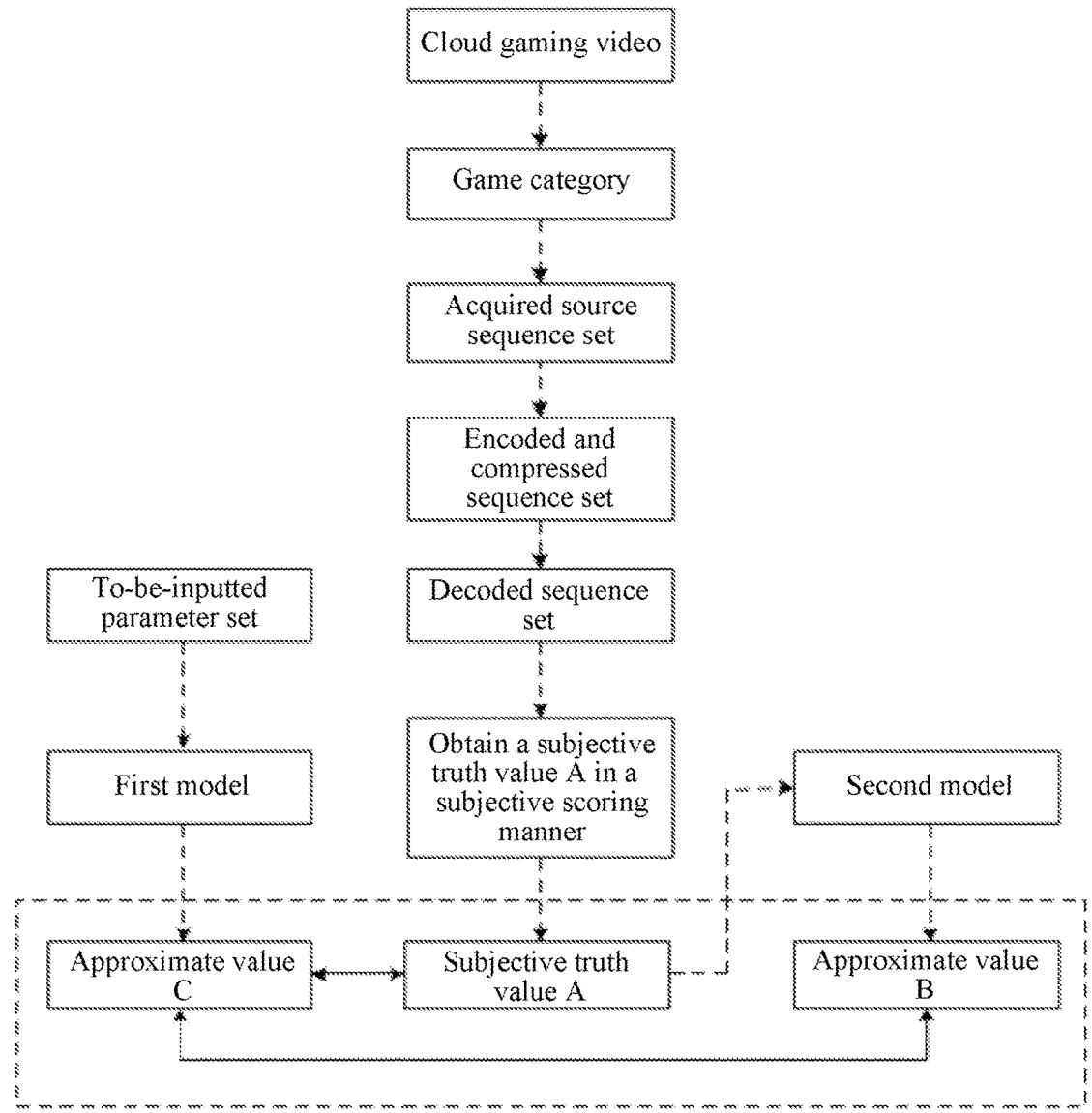
FIG. 5 is a schematic block diagram of a training principle and an assessment principle of a first model according to an embodiment of this disclosure.

FIG. 5 is a schematic block diagram of a training principle and an assessment principle of a first model according to an embodiment of this disclosure.

As shown in FIG. 5, the fitting process for the first model may be represented by a dotted single arrow in FIG. 5. On the one hand, a subjective truth value A of an image frame in a decoded sequence set needs to be obtained in a subjective scoring manner, so that the obtained subjective truth value A is used as a training set for training the second model. On the other hand, the first model needs to be obtained based on the second model and a to-be-inputted parameter set. The optimization process for the first model may be represented by solid double arrows. On the one hand, the first model may be assessed based on an approximate value B of a subjective truth value outputted by the second model and an approximate value C of a subjective truth value outputted by the first model. On the other hand, the first model may be assessed based on the subjective truth value A and an approximate value C of the subjective truth value outputted by the first model.

In the process of training the second model, the following steps may be included:

(1) Obtain a decoded sequence set.

Since there are various types of cloud games, the complexity is not the same, and subjective feelings are not the same. In this disclosure, cloud game videos may be classified according to scene, so that a second sub-model in the second model and a first sub-model in the first model can be trained for a scene. Certainly, the cloud game videos classified according to scenes may be segmented according to game occasions, so that a second sub-model in the second model and a first sub-model in the first model may be trained for a game situation in one scenario. The embodiments of this disclosure does not limit the specific classification of scenarios and game occasions. Specific classification of the scenes and game occasions is not limited in this embodiment of this disclosure. For example, the scene may be a type of a device configured to play the to-be-assessed video or the to-be-assessed image. The game occasion may be a scene of a game screen, such as a battle scene or a non-combat scene. The cloud game videos are classified. For a certain type of video after classification (such as an acquired source sequence set), the video may be encoded and compressed according to an encoding configuration solution (adapted to properties of the cloud game such as a frame rate, a bit rate, a resolution, and the like), to obtain an encoded and compressed sequence set. As a result, encoded and compressed sequence set is compressed with loss relative to the acquired source sequence set, causing a loss of details of video image quality. Then, the encoded and compressed sequence set is decoded to obtain a decoded sequence set. The decoded sequence set may be the k training samples.

(2) Obtain a subjective truth value A of an image frame in the decoded sequence set in a subjective scoring manner.

Since the scenes of the cloud games are different from the subjective video scenes of real-time communication, for example, the scenes of the cloud games may involve a mobile terminal, a fixed PC, and a TV terminal. Moreover, game players' requirements for experience are also different from those of a real-time communication user. In this disclosure, the subjective truth value A of the image frame in the decoded sequence set may be obtained in a subjective scoring manner through a set of standard systems for subjective assessment of cloud game videos. For example, the encoded and compressed sequence set is played through third-party decoding, and then manual (that is, the assessors) are organized to subjectively scoring according to the standard system for subjective assessment of the cloud game videos, to obtain the subjective truth value A of the image frame in the decoded sequence set.

(3) The second model is trained based on the subjective truth value A of the image frame in the decoded sequence set.

The decoded sequence set is produced by third-party decoding for the encoded and compressed sequence set and is used as a training set of the second model to train the second model, and an approximate value B (infinitely close to the subjective truth value A) of the subjective truth value of the image frame in the decoded sequence set is obtained by using the trained second model. This disclosure basically does not require the performance complexity of the second model, but only requires relatively high accuracy, that is, the second model may be a very complex model with very high accuracy.

(4) Obtain the first model based on the second model.

After using the trained second model to obtain the approximation value B of the subjective truth value of the image frame in the decoded sequence set, fitting calculation may be performed based on the approximation value B of the subjective truth value of the image frame in the decoded sequence set and the parameters of the image frame in the decoded sequence set, to obtain the first model. Fitting is to connect a series of points on a plane with a smooth curve. Since there are an infinite number of possibilities for connecting curves, there are various fitting manners. The fitted curve may generally be represented by a function, and different functions may have different fitting names. A commonly used fitting manner includes a least square curve fitting manner, or the like. The fitting name may be referred to as linear fitting or linear regression (mainly in statistics) in a case that a pending function is linear; or otherwise, the fitting name is referred to as non-linear fitting or non-linear regression. The expression may also be a piecewise function, and in this case the fitting name is spline fitting. For example, a first model involved in this disclosure may be a model obtained through fitting. A prediction result of the first model may be an approximate value approximating the subjective truth value.

In some embodiments, the method 100 may further include:

integrating the first model into a service system in a case that the assessment result of the first model is positive; and refitting, in a case that the assessment result of the first model is negative, the first model until the assessment result of the first model is positive.

In other words, in a case that the first model achieves an expected assessment effect, the first model may be integrated into the service system; and in a case that the first model fails to achieve the expected effect, the first model needs to be refitted until the first model reaches the expected effect.

In some embodiments, the method 100 may further include:

reporting the first approximate value to the second model through a statistics collecting module; obtaining a second approximate value of the to-be-assessed sample by using the second model; determining whether to optimize the first model based on the first approximate value and the second approximate value; optimizing, in a case that a difference between the first approximate value and the second approximate value is greater than a third preset threshold, the first model by using the parameters and the second approximate value of the to-be-assessed sample; and determining that there is no need to optimize the first model in a case that the difference between the first approximate value and the second approximate value is less than or equal to the third preset threshold.

Briefly, the first model may be optimized by using the first approximate value, to improve the accuracy of the first model.

In some embodiments, a subjective truth value of the to-be-assessed sample is obtained before whether to optimize the first model based on the first approximate value and the second approximate value is determined; in a case that a difference between the second approximate value and the subjective truth value of the to-be-assessed sample is greater than a fourth preset threshold, the second model is optimized by using the to-be-assessed sample and the subjective truth value of the to-be-assessed sample.

Briefly, the second model may be optimized by using the first approximate value, to improve the accuracy of the second model.

Figure 6:
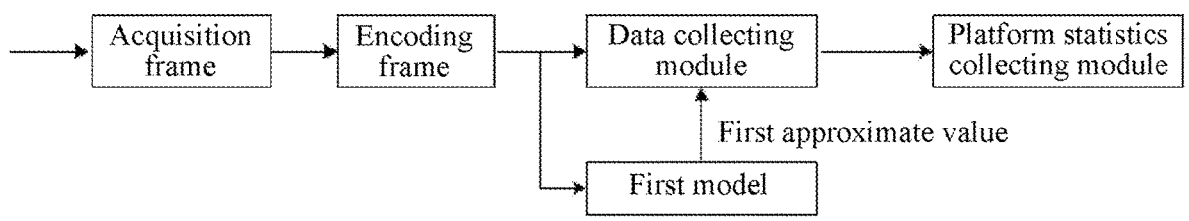
FIG. 6 is a schematic block diagram of an optimization principle of a first model according to an embodiment of this disclosure.

FIG. 6 is a schematic block diagram of an optimization principle of a first model according to an embodiment of this disclosure.

As shown in FIG. 6, a first model for calculating an approximation value approximating the subjective truth value is obtained first, and then the first model is placed in a cloud game server system. Based on this, an acquisition frame (that is, the to-be-assessed sample) and then the acquisition frame is encoded to obtain an encoded frame. Then, the parameters of the to-be-assessed sample that need to be inputted into the first model are obtained by encoding the parameters and bit stream information brought by the frame. After the parameters of the to-be-assessed sample are inputted into the first model, the first model performs calculation based on the parameters of the to-be-assessed sample, and the first approximation value of the to-be-assessed sample is obtained. In this case, the first approximation value can be fed back to the platform statistics module through the data statistics module, so that the platform statistics module determines whether to optimize the first model or the second model based on the first approximation value.

Figure 7:
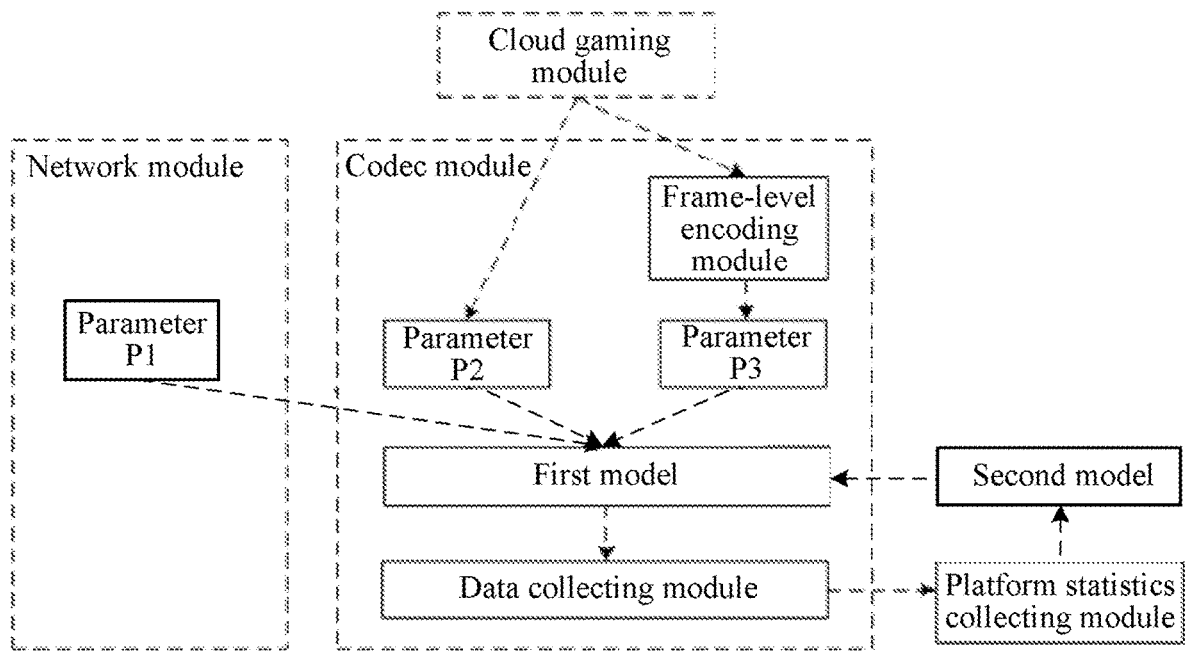
FIG. 7 is a schematic block diagram of a service system including a first model according to an embodiment of this disclosure.

FIG. 7 is a schematic block diagram of a service system including a first model according to an embodiment of this disclosure.

As shown in FIG. 7, the fitted first model is integrated into the codec module in a service system, and input parameters, such as a parameter P1, a parameter P2, and a parameter P3, can be obtained from the service system. The parameter P1 represents the feedback parameter of the network module, the parameter P2 represents the set parameter of the cloud game module, and the parameter P3 represents the calculation parameter of the codec module. Then, the first model calculates the first approximation value of the to-be-assessed sample based on the parameter P1, the parameter P2 and the parameter P3. In a possible implementation, the first approximation value can be reported to the platform statistics collecting module of the service system through the data collecting module, so that the platform statistics collecting module can determine whether the second model needs to be adjusted based on the first approximation value and whether it is necessary to optimize the first model. For example, the platform statistics collecting module can perform statistical classification and determine whether to optimize the first sub-model or the second sub-model corresponding to the classification. Of course, after optimizing the second model, the first model may also be optimized based on the optimized second model, which is not specifically limited in this embodiment of this disclosure. By optimizing the first model, the accuracy of the approximation value can be improved.

In some embodiments, the first model includes first sub-models corresponding to a plurality of scenarios, the second model includes second sub-models corresponding to the plurality of scenarios, and the plurality of first sub-models are obtained based on the corresponding second sub-models. the plurality of scenarios including a first scenario in which the to-be-assessed sample is located. Based on this, S120 may include: determining a first sub-model corresponding to the first scenario; and calculating the first approximate value by using the first sub-model corresponding to the first scenario based on the parameters of the to-be-assessed sample.

In other words, parameters based on samples in different scenarios can be fitted into different first sub-models, and different second sub-models can be obtained by training based on samples in different scenarios. In this way, the accuracy of the first sub-model and the second sub-model may be improved.

In some embodiments, the plurality of scenarios includes a type of a device configured to play the to-be-assessed video or the to-be-assessed image.

Of course, in other alternative embodiments of this disclosure, the multiple scenarios may also include an application program or a playback method to which the to-be-assessed video or to-be-assessed image belongs, which is not specifically limited in this disclosure.

In some embodiments, the first model is a reduced-reference model or a no-reference model, and the second model is a full-reference model or a no-reference model, the reduced-reference model being a model obtained by referring to some parameters of a to-be-compressed image frame and a compressed image frame, the no-reference model being a model obtained by only referring to the compressed image frame, and the full-reference model being a model obtained by referring to the to-be-compressed image frame and the compressed image frame.

Certainly, the reduced-reference model may also be a model obtained by referring to some parameters of a to-beencoded image frame and an encoded image frame, the no-reference model being a model obtained by only referring to the encoded image frame, and the full-reference model being a model obtained by referring to the to-be-encoded image frame and the encoded image frame. This is not limited in this disclosure.

Based on the above, this disclosure provides a method for assessing image/video quality based on an approximate value, which can access the subjective quality of the video in real time. Information such as cloud game types and platforms may be classified, to obtain a subjective truth value A of k training samples for a certain classification. Then an approximation value B (very close to A) approximating the subjective truth value A of the k training samples is obtained through the offline second model. An obtained approximate value B is used as a reference truth value, and a plurality of parameters inputted into the k training samples are fitted into the first model (which is configured to calculate an approximate value C approximating the subjective truth value A and can quickly calculate the approximate value C). Based on this, an approximation value approximating the subjective truth value of a cloud game real-time video may be obtained online through the first model. For subsequent new games, the online first model may be optimized based on the updated second model in a manner of updating the second model.

Figure 8:
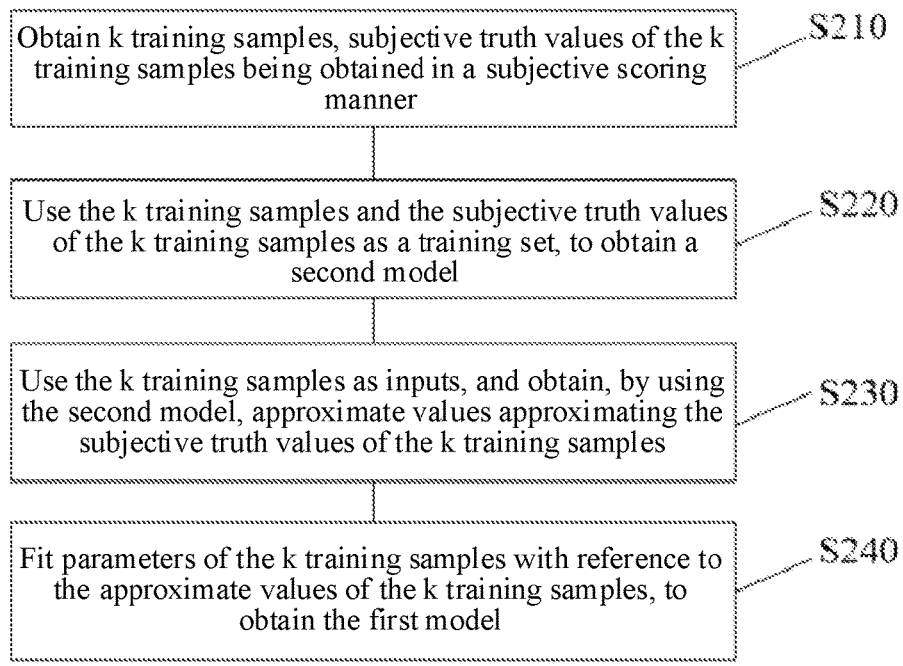
FIG. 8 is a schematic flowchart of a method for training a first model according to an embodiment of this disclosure.

FIG. 8 is a schematic flowchart of a method 200 for training a first model according to an embodiment of this disclosure. The solutions provided in the embodiments of this disclosure may be performed by any electronic device having a data processing capability. For example, the electronic device may be implemented as a server. The server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, big data, and an artificial intelligence platform. The server may be directly or indirectly connected in a wired or wireless communication manner. This is not limited in this disclosure.

As shown in FIG. 8, the method 200 may include the following steps:

S210: Obtain k training samples, subjective truth values of the k training samples being obtained in a subjective scoring manner. For example, k training samples are obtained, subjective quality values of the k training samples being obtained in a subjective scoring manner. The k training samples are at least one of video samples or image samples.

S220: Use the k training samples and the subjective truth values of the k training samples as a training set, to obtain a second model. For example, the k training samples and the subjective quality values of the k training samples are used as a training set, to obtain a second model.

S230: Use the k training samples as inputs, and obtain, by using the second model, approximate values approximating the subjective truth values of the k training samples. For example, the k training samples are input into the second model to obtain, as output, approximate values approximating the subjective quality values of the k training samples.

S240: Fit parameters of the k training samples with reference to the approximate values of the k training samples, to obtain the first model.

The method 200 may further include solutions related to the assessment and optimization of the first model in the method 100. In other words, for the related solutions in the method 200 due to the assessment and optimization of the first model, reference may be made to the corresponding solutions in the method 100. To avoid repetition, details are not described herein again.

Exemplary implementations of this disclosure are described in detail above with reference to the accompanying drawings. However, this disclosure is not limited to the specific details in the foregoing implementations. In the scope of the technical thinking of this disclosure, many simple modifications can be performed on the technical solution of this disclosure, and the simple modifications all belong to the protection scope of this disclosure. For example, the specific technical features described in the above specific implementations may be combined in any suitable manner without contradiction. To avoid unnecessary repetition, various possible combinations are not further described in this disclosure. In another example, the various implementations of this disclosure may be combined without departing from the idea of this disclosure, and such combinations shall also fall within the scope of this disclosure.

It is to be further understood that in various method embodiments of this disclosure, an order of sequence numbers of the foregoing processes does not indicate an execution sequence, and execution sequences of the processes should be determined according to functions and internal logic thereof and should not impose any limitation on an implementation process of the embodiments of this disclosure. In addition, the term "and/or" in the embodiments of this disclosure describes only an association relationship for describing associated objects and indicates that three relationships may exist. Specifically, A and/or B may represent the following three cases: Only A exists, both A and B exist, and only B exists. In addition, the character "/" in this specification generally indicates an "or" relationship between the associated objects.

The method provided in the embodiments of this disclosure is described above, and an apparatus provided in the embodiments of this disclosure is described below.

Figure 9:
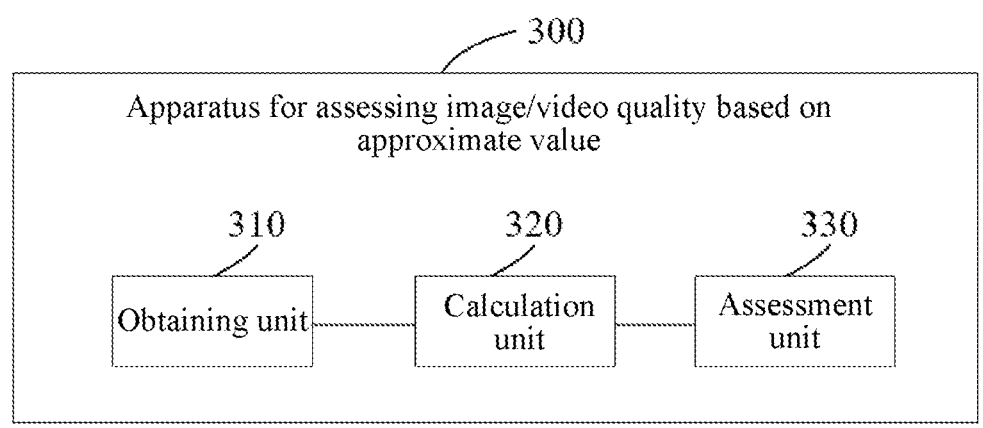
FIG. 9 is a schematic flowchart of an apparatus for assessing image/video quality based on an approximate value according to an embodiment of this disclosure.

FIG. 9 is a schematic flowchart of an apparatus 300 for assessing image/video quality based on an approximate value according to an embodiment of this disclosure.

an obtaining unit 310, configured to obtain a to-be-assessed sample, the to-be-assessed sample including a to-be-assessed video or a to-be-assessed image;

a calculation unit 320, configured to calculate, by using an online first model, a first approximate value approximating a subjective truth value of the to-be-assessed sample based on parameters of the to-be-assessed sample, the first model being a model obtained based on an offline second model, the second model being a model obtained by using k training samples and subjective truth values of the k training samples as a training set, the subjective truth values of the k training samples being obtained in a subjective scoring manner, and the first model being a model obtained by fitting parameters of the k training samples with reference to approximate values of the k training samples obtained by using the second model, k being a positive integer; and an assessment unit 330, configured to assess quality of the to-be-assessed video or the to-be-assessed image based on the first approximate value.

In some embodiments, the parameters of the to-be-assessed sample include at least one of the following: a feedback parameter of a network module, a set parameter of a cloud game module, or a calculation parameter of a codec module.

In some embodiments, before the calculation unit 320 calculates, by using the online first model, the first approximate value approximating the subjective truth value (subjective quality value) of the to-be-assessed sample based on the parameters of the to-be-assessed sample, the assessment unit 330 is further configured to:

calculate the approximate values of the k training samples by using the first model based on the parameters of the k training samples;
assess the first model based on the approximate values of the k training samples obtained by using the second model and the approximate values of the k training samples calculated by using the first model; and
for each of the k training samples, determine that an assessment result of the first model is positive in a case that a difference between an approximate value calculated by using the first model and an approximate value obtained by using the second model is less than or equal to a first preset threshold; or otherwise, determine that the assessment result of the first model is negative.

In some embodiments, before the calculation unit 320 calculates, by using the online first model, the first approximate value approximating the subjective truth value of the to-be-assessed sample based on the parameters of the to-be-assessed sample, the assessment unit 330 is further configured to:

assess the first model based on the subjective truth values of the k training samples and the approximate values of the k training samples calculated by using the first model; and
for each of the k training samples, determine that an assessment result of the first model is positive in a case that a difference between an approximate value calculated by using the first model and a subjective truth value is less than or equal to a second preset threshold; or otherwise, determine that the assessment result of the first model is negative.

In some embodiments, the assessment unit 330 is further configured to:

integrate the first model into a service system in a case that the assessment result of the first model is positive; and refit, in a case that the assessment result of the first model is negative, the first model until the assessment result of the first model is positive.

In some embodiments, the assessment unit 330 is further configured to:

report the first approximate value to the second model through a statistics collecting module (or statistics collecting function);
obtain a second approximate value of the to-be-assessed sample by using the second model;
optimize, in a case that a difference between the first approximate value and the second approximate value is greater than a third preset threshold, the first model by using the parameters and the second approximate value of the to-be-assessed sample; and determine that there is no need to optimize the first model in a case that the difference between the first approximate value and the second approximate value is less than or equal to the third preset threshold.

In some embodiments, before the assessment unit 330 determines whether to optimize the first model based on the first approximate value and the second approximate value, the assessment unit 330 is further configured to:

obtain a subjective truth value of the to-be-assessed sample; and
optimize, in a case that a difference between the second approximate value and the subjective truth value of the to-be-assessed sample is greater than a fourth preset threshold, the second model by using the to-be-assessed sample and the subjective truth value of the to-be-assessed sample.

In some embodiments, the first model includes first sub-models respectively corresponding to a plurality of scenarios, the plurality of scenarios including a first scenario in which the to-be-assessed sample is located; and the calculation unit 320 is further configured to:

determine a first sub-model corresponding to the first scenario; and
calculate the first approximate value by using the first sub-model corresponding to the first scenario based on the parameters of the to-be-assessed sample.

In some embodiments, the plurality of scenarios includes a type of a device configured to play the to-be-assessed video or the to-be-assessed image.

In some embodiments, the first model is a reduced-reference model or a no-reference model, and the second model is a full-reference model or a no-reference model, the reduced-reference model being a model obtained by referring to some parameters of a to-be-compressed image frame and a compressed image frame, the no-reference model being a model obtained by only referring to the compressed image frame, and the full-reference model being a model obtained by referring to the to-be-compressed image frame and the compressed image frame.

Figure 10:
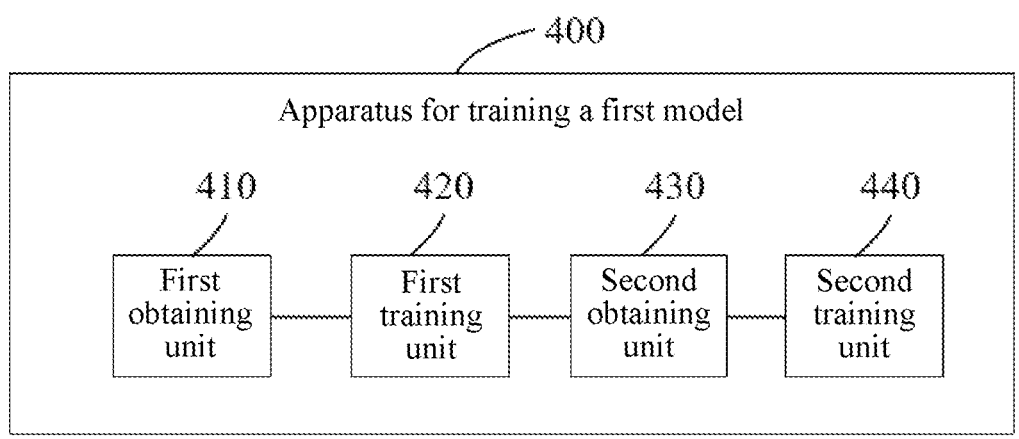
FIG. 10 is a schematic block diagram of an apparatus for training a first model according to an embodiment of this disclosure.

FIG. 10 is a schematic block diagram of an apparatus 400 for training a first model according to an embodiment of this disclosure.

As shown in FIG. 10, the apparatus 400 may include:
a first obtaining unit 410, configured to obtain k training samples, subjective truth values of the k training samples being obtained in a subjective scoring manner;
a first training unit 420, configured to use the k training samples and the subjective truth values of the k training samples as a training set, to obtain a second model;
a second obtaining unit 430, configured to use the k training samples as inputs, and obtain, by using the second model, approximate values approximating the subjective truth values of the k training samples; and
a second training unit 440, configured to fit parameters of the k training samples with reference to the approximate values of the k training samples, to obtain the first model.

The apparatus embodiment and the method embodiment may correspond to each other. For a similar description, reference may be made to the method embodiment. To avoid repetition, details are not described herein again. Specifically, the apparatus 300 may correspond to a corresponding main body in executing the method 100 of the embodiments of this disclosure, and each unit in the apparatus 300 is respectively configured to implement the corresponding process in the method 100. Similarly, the apparatus 400 may correspond to a corresponding main body in executing the method 200 of the embodiments of this disclosure, and the units in the apparatus 400 may be configured to implement the process in the method 200. For brevity, details are not described herein again.

It is to be further understood that, the units of the video processing apparatus involved in the embodiments of this disclosure may be separately or wholly combined into one or several other units, or one (or more) of the units herein may further be divided into a plurality of units of smaller functions. In this way, same operations may be implemented, and the implementation of the technical effects of the embodiments of this disclosure is not affected. The foregoing units are divided based on logical functions. In an actual application, a function of one unit may also be implemented by a plurality of units, or functions of a plurality of units are implemented by one unit. In other embodiments of this disclosure, the apparatus 300 or the apparatus 400 may also include other units. In an actual application, these functions may also be cooperatively implemented by other units and may be cooperatively implemented by multiple units. According to another embodiment of this disclosure, a computer program (including program code) that can perform the steps in the corresponding method may be run on a general-purpose computing device, such as a computer, which includes processing elements and storage elements such as a central processing unit (CPU), a random access memory (RAM), and a read-only memory (ROM), to construct the apparatus 300 or the apparatus 400 involved in the embodiments of this disclosure and implement the method for assessing image/video quality based on an approximate value or the method for training a first model in the embodiments of this disclosure. The computer program may be recorded in, for example, a computer-readable storage medium, and may be loaded into the foregoing electronic device by using the computer-readable storage medium, and run on the computing device, to implement the corresponding method in the embodiments of this disclosure.

In other words, the units mentioned above may be implemented in the form of hardware, may also be implemented by instructions in the form of software, and may also be implemented in the form of a combination of software and hardware. Specifically, the steps of the foregoing method embodiment may be implemented by using a hardware integrated logic circuit in the processor or implemented by using an instruction in a software form, and the steps of the methods disclosed with reference to the embodiments of this disclosure may be directly performed and completed by using a hardware decoding processor, or may be performed and completed by using a combination of hardware and software in the decoding processor. The software may be located in a mature storage medium in the art, such as a random access memory, a flash memory, a read-only memory, a programmable read-only memory, an electrically-erasable programmable memory, or a register. The storage medium is located in the memory. The processor reads information in the memory and completes the steps of the foregoing method embodiments in combination with hardware thereof.

Figure 11:
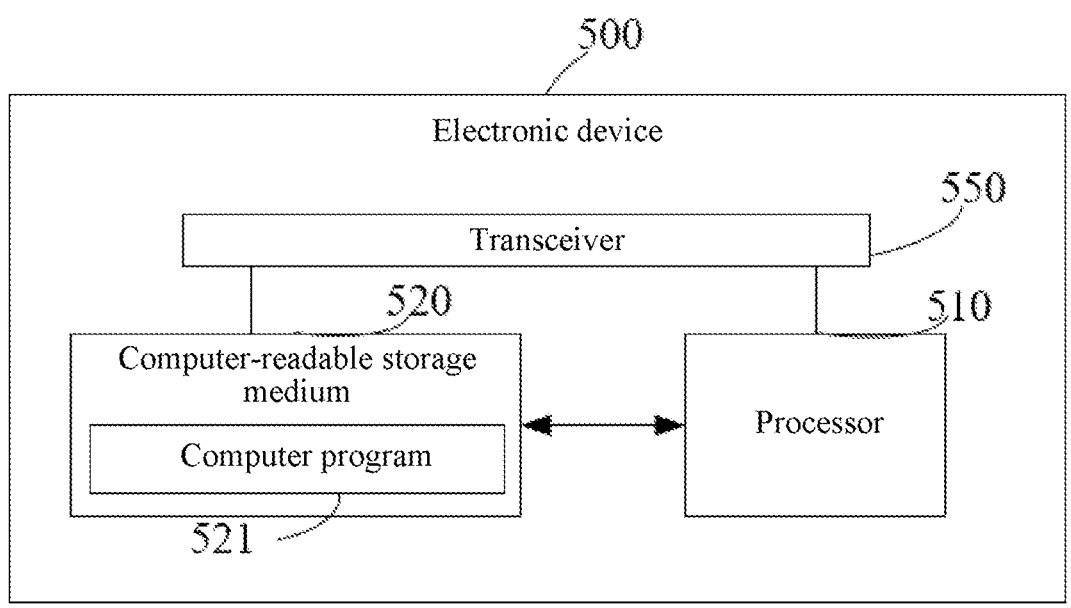
FIG. 11 is a schematic block diagram of an electronic device according to an embodiment of this disclosure.

FIG. 11 is a schematic diagram of an electronic device 500 according to an embodiment of this disclosure.

As shown in FIG. 11, the electronic device 500 include at least a processor 510 (including processing circuitry) and a non-transitory computer-readable storage medium 520. The processor 510 and the computer-readable storage medium 520 may be connected by using a bus or in another manner. The computer-readable storage medium 520 is configured to store a computer program 521. The computer program 521 includes computer instructions. The processor 510 is configured to execute the computer instructions stored in the computer-readable storage medium 520. The processor 510 is a computing core and a control core of the electronic device 500, is suitable for implementing one or more computer instructions, and is specifically suitable for loading and executing one or more computer instructions to implement a corresponding method procedure or a corresponding function.

In an example, the processor 510 may also be referred to as a central processing unit (CPU). The processor 510 may be, but is not limited to: a general-purpose processor, a digital signal processor (DSP), an application-specific integrated circuit (ASIC), a field programmable gate array (FPGA), or another programmable logical device, discrete gate or transistor logical device, discrete hardware component, or the like.

For example, the computer-readable storage medium 520 may be a high-speed random access memory (RAM), or may be a non-volatile memory, for example, at least one magnetic disk memory. The computer-readable storage medium may further be at least one computer-readable storage medium far away from the foregoing processor 510. Specifically, the computer-readable storage medium 520 includes, but is not limited to, a volatile memory and/or a non-volatile memory. The non-volatile memory may be a read-only memory (ROM), a programmable ROM (PROM), an erasable programmable read-only memory (EPROM), an electrically EPROM (EEPROM), or a flash memory. The volatile memory may be a random access memory (RAM), and is used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synch Link DRAM, SLDRAM), and a direct rambus dynamic random access memory (Direct Rambus RAM, DR RAM).

In an implementation, the electronic device 500 may be an apparatus 300 for assessing image/video quality based on an approximate value shown in FIG. 9. The computer-readable storage medium 520 stores computer instructions. The computer instructions stored in the computer-readable storage medium 520 are loaded and executed by the processor 510, to implement the corresponding steps in the method embodiments shown in FIG. 3. In a specific implementation, the computer instructions in the computer-readable storage medium 520 are loaded by the processor 510 to perform the corresponding steps. To avoid repetition, details are not described herein again.

In an implementation, the electronic device 500 may be the apparatus 400 for training a first model shown in FIG. 10. The computer-readable storage medium 520 stores computer instructions. The processor 510 loads and implements the computer instructions stored in the computer-readable storage medium 520, to implement the corresponding steps in the method embodiments shown in FIG. 8. In a specific implementation, the computer instructions in the computer-readable storage medium 520 are loaded by the processor 510 to further perform the corresponding steps. To avoid repetition, details are not described herein again:

According to another aspect of this disclosure, an embodiment of this disclosure further provides a computer-readable storage medium, and the computer-readable storage medium is a memory device in the electronic device 500 and is configured to store programs and data, for example, the computer-readable storage medium 520. It may be understood that the computer-readable storage medium 520 herein may include an internal storage medium of the electronic device 500 and certainly may also include an extended storage medium supported by the electronic device 500. The computer-readable storage medium provides storage space, and the storage space stores an operating system of the electronic device 500. In addition, the storage space further stores one or more computer instructions suitable for being loaded and executed by the processor 510. The computer instructions may be one or more computer programs 521 (including program code).

According to another aspect of this disclosure, a computer program product or a computer program is provided, the computer program product or the computer program including computer instructions stored in a computer-readable storage medium, for example, the computer program 521. In this case, the electronic device 500 may be a computer, the processor 510 reads the computer instructions from the computer-readable storage medium 520, and the processor 510 executes the computer instructions, to cause the computer to perform the method for assessing image/video quality based on an approximate value or the method for training a first model provided in various implementations.

In other words, when implemented by using software, all or some of the steps may be implemented in a form of a computer program product. The computer program product includes one or more computer instructions. When the computer program instructions are loaded and executed on the computer, the procedures or functions according to the embodiments of this disclosure are all or partially executed. The computer may be a general-purpose computer, a special-purpose computer, a computer network, or another programmable apparatus. The computer instructions may be stored in a computer readable storage medium or transmitted from one computer readable storage medium to another computer readable storage medium. For example, the computer instructions may be transmitted from one website, computer, server or data center to another website, computer, server or data center in a wired (for example, a coaxial cable, an optical fiber or a digital subscriber line (DSL)) or wireless (for example, infrared, wireless or microwave) manner.

A person of ordinary skill in the art may be aware that the units and steps in the examples described with reference to the embodiments disclosed in this specification can be implemented by electronic hardware or a combination of computer software and electronic hardware. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of this disclosure.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. A method for assessing image/video quality based on an approximate value, the method comprising:
    obtaining a sample, the sample comprising a video or an image;
    calculating a first approximate value approximating a subjective quality value of the sample by using an online model based on parameters of the sample, wherein the online model is implemented by a server and comprises a plurality of first sub-models respectively corresponding to a plurality of scenarios, the plurality of scenarios comprising a first scenario to which the sample corresponds; and
    assessing quality of the video or the image of the sample based on the first approximate value using the first sub-model of the plurality of first sub-models that corresponds to the first scenario, and
    wherein the online model is generated based on an offline model comprising a plurality of second sub-models respectively corresponding to the plurality of scenarios, the first sub-model being generated based on a second sub-model of the plurality of second sub-models that corresponds to the first scenario, and the offline model is trained using k training samples and subjective quality values of the k training samples as a training set, the subjective quality values of the k training samples are obtained in a subjective scoring manner, and the first sub-model is generated by fitting parameters of the k training samples with reference to approximate values of the k training samples output by the second sub-model that corresponds to the first scenario, k being a positive integer.

2. The method according to claim 1, wherein the parameters of the sample comprise at least one of: a feedback parameter of a network module, a set parameter of a cloud game module, or a calculation parameter of a codec module.

3. The method according to claim 1, further comprising:
    before the calculating,
    calculating approximate values of the k training samples by using the first sub-model based on the parameters of the k training samples;
    assessing the online model based on the approximate values of the k training samples obtained by using the second sub-model and the approximate values of the k training samples calculated by using the first sub-model; and
    for each of the k training samples, determining that an assessment result of the online model is positive in response to a determination that a difference between an approximate value calculated by using the first sub-model and an approximate value obtained by using the second sub-model is less than or equal to a first preset threshold, and otherwise determining that the assessment result of the online model is negative.

4. The method according to claim 1, further comprising:
    before the calculating,
    assessing the online model based on the subjective quality values of the k training samples and approximate values of the k training samples calculated by using the first sub-model; and
    for each of the k training samples, determining that an assessment result of the online model is positive in response to a determination that a difference between an approximate value calculated by using the the first sub-model and a subjective quality value is less than or equal to a second preset threshold, and otherwise determining that the assessment result of the online model is negative.

5. The method according to claim 3, further comprising:
integrating the online model into a service system when the assessment result of the online model is positive; and
refitting, when the assessment result of the online model is negative, the first sub-model until the assessment result of the online model is positive.

6. The method according to claim 1, further comprising:
reporting the first approximate value to the offline model through a statistics collecting function;
obtaining a second approximate value of the sample by using the offline model;
optimizing, when a difference between the first approximate value and the second approximate value is greater than a third preset threshold, the first sub-model by using the parameters and the second approximate value of the sample; and
determining that there is no need to optimize the first sub-model in response to a determination that the difference between the first approximate value and the second approximate value is less than or equal to the third preset threshold.

7. The method according to claim 6, further comprising:
before the optimizing,
obtaining the subjective quality value of the sample; and
optimizing, in a case that a difference between the second approximate value and the subjective quality value of the sample is greater than a fourth preset threshold, the offline model by using the sample and the subjective quality value of the sample.

8. The method according to claim 1, wherein
the calculating comprises:
determining the first sub-model corresponding to the first scenario; and
calculating the first approximate value by using the first sub-model corresponding to the first scenario based on the parameters of the sample.

9. The method according to claim 8, wherein at least one of the plurality of scenarios defines a type of a device configured to play the video or the image.

10. The method according to claim 1, wherein the online model is a reduced-reference model or a no-reference model, and the offline model is a full-reference model or a no-reference model, the reduced-reference model being a model obtained by referring to some parameters of a to-be-compressed image frame and a compressed image frame, the no-reference model being a model obtained by only referring to the compressed image frame, and the full-reference model being a model obtained by referring to the to-be-compressed image frame and the compressed image frame.

11. An apparatus for assessing image/video quality based on an approximate value, the apparatus comprising:
processing circuitry configured to:
obtain a sample, the sample comprising a video or an image;
calculate a first approximate value approximating a subjective quality value of the sample by using an online model based on parameters of the sample, wherein the online model is implemented by a server and comprises a plurality of first sub-models respectively corresponding to a plurality of scenarios, the plurality of scenarios comprising a first scenario to which the sample corresponds; and
assess quality of the video or the image of the sample based on the first approximate value using the first sub-model of the plurality of first sub-models that corresponds to the first scenario, and
wherein the online model is generated based on an offline model comprising a plurality of second sub-models respectively corresponding to the plurality of scenarios, the first sub-model being generated based on a second sub-model of the plurality of second sub-models that corresponds to the first scenario, and the offline model is trained using k training samples and subjective quality values of the k training samples as a training set, the subjective quality values of the k training samples are obtained in a subjective scoring manner, and the first sub-model is generated by fitting parameters of the k training samples with reference to approximate values of the k training samples output by the second sub-model that corresponds to the first scenario, k being a positive integer.

12. The apparatus according to claim 11, wherein the parameters of the sample comprise at least one of: a feedback parameter of a network module, a set parameter of a cloud game module, or a calculation parameter of a codec module.

13. The apparatus according to claim 11, wherein the processing circuitry is further configured to:
before calculating the first approximate value,
calculate approximate values of the k training samples by using the online model first sub-model based on the parameters of the k training samples;
assess the online model based on the approximate values of the k training samples obtained by using the second sub-model and the approximate values of the k training samples calculated by using the first sub-model; and
for each of the k training samples, determine that an assessment result of the online model is positive in response to a determination that a difference between an approximate value calculated using the first sub-model and an approximate value obtained by using the second sub-model is less than or equal to a first preset threshold, and otherwise determining that the assessment result of the online model is negative.

14. The apparatus according to claim 11, wherein the processing circuitry is further configured to:
before calculating the first approximate value,
assess the online model based on the subjective quality values of the k training samples and approximate values of the k training samples calculated by using the first sub-model; and
for each of the k training samples, determine that an assessment result of the online model is positive in response to a determination that a difference between an approximate value calculated by using the the first sub-model and a subjective quality value is less than or equal to a second preset threshold, and otherwise determine that the assessment result of the online model is negative.

15. The apparatus according to claim 13, wherein the processing circuitry is further configured to:
integrate the online model into a service system when the assessment result of the online model is positive; and refit, when the assessment result of the online model is negative, the first sub-model until the assessment result of the online model is positive.

16. The apparatus according to claim 11, wherein the processing circuitry is further configured to:
report the first approximate value to the offline model through a statistics collecting function;
obtain a second approximate value of the sample by using the offline model;
optimize, when a difference between the first approximate value and the second approximate value is greater than a third preset threshold, the first sub-model by using the parameters and the second approximate value of the sample; and
determine that there is no need to optimize the first sub-model in response to a determination that the difference between the first approximate value and the second approximate value is less than or equal to the third preset threshold.

17. The apparatus according to claim 16, wherein the processing circuitry is further configured to:
before optimizing the online model,
obtain the subjective quality value of the sample; and
optimize, in a case that a difference between the second approximate value and the subjective quality value of the sample is greater than a fourth preset threshold, the offline model by using the sample and the subjective quality value of the sample.

18. The apparatus according to claim 11, wherein the processing circuitry is further configured to:
determine the first sub-model corresponding to the first scenario; and
calculate the first approximate value by using the first sub-model corresponding to the first scenario based on the parameters of the sample.

19. The apparatus according to claim 18, wherein at least one of the plurality of scenarios defines a type of a device configured to play the video or the image.

20. A method for training a first model, the method comprising:
obtaining k training samples, subjective quality values of the k training samples being obtained in a subjective scoring manner, wherein the k training samples comprise at least one of video samples or image samples;
training, using the k training samples and the subjective quality values of the k training samples as a training set, a second model comprising a plurality of second sub-models respectively corresponding to a plurality of scenarios, the plurality of scenarios comprising a first scenario to which the k training samples correspond, to obtain a second sub-model of the plurality of second sub-models corresponding to the first scenario;
inputting the k training samples into the second sub-model to obtain, as output, approximate values approximating the subjective quality values of the k training samples;
fitting parameters of the k training samples with reference to the approximate values output by the second sub-model that corresponds to the first scenario, to generate a first, sub-model; and
generating a first model comprising a plurality of first sub-models respectively corresponding to the plurality of scenarios, wherein the first sub-model of the plurality of first sub-models corresponds to the first scenario.

\* \* \* \* \*